US012270908B2

(12) United States Patent
Hu et al.

(10) Patent No.: US 12,270,908 B2
(45) Date of Patent: Apr. 8, 2025

(54) VIRTUAL BEAMS FOR IDENTIFICATION OF EDGE AND PLANAR POINTS IN LIDAR POINT CLOUD OBTAINED WITH VEHICLE LIDAR SYSTEM

(71) Applicant: GM Global Technology Operations LLC, Detroit, MI (US)

(72) Inventors: Yao Hu, Sterling Heights, MI (US); Xinyu Du, Oakland Township, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 658 days.

(21) Appl. No.: 17/516,318

(22) Filed: Nov. 1, 2021

(65) Prior Publication Data

US 2023/0135965 A1    May 4, 2023

(51) Int. Cl.
*G01S 17/89* (2020.01)
*B60W 40/10* (2012.01)

(52) U.S. Cl.
CPC ............. *G01S 17/89* (2013.01); *B60W 40/10* (2013.01); *B60W 2420/408* (2024.01)

(58) Field of Classification Search
CPC ...... G01S 17/89; G01S 17/931; B60W 40/10; B60W 2420/408
See application file for complete search history.

(56) References Cited

U.S. PATENT DOCUMENTS

| | | | | |
|---|---|---|---|---|
| 9,329,269 | B2* | 5/2016 | Zeng | G01S 17/58 |
| 11,830,136 | B2* | 11/2023 | Huber | G06T 17/10 |
| 2014/0064555 | A1* | 3/2014 | Sebastian | G01S 7/4808 |
| | | | | 382/103 |
| 2019/0179026 | A1* | 6/2019 | England | G01S 7/4026 |
| 2019/0324471 | A1* | 10/2019 | Kim | G01S 17/931 |
| 2020/0302237 | A1* | 9/2020 | Hennings Yeomans | |
| | | | | G06V 20/56 |
| 2021/0208281 | A1* | 7/2021 | Trofymov | G01S 17/89 |
| 2021/0286081 | A1* | 9/2021 | Nagashima | G08G 1/015 |
| 2021/0326734 | A1* | 10/2021 | Van der Auwera | H04N 19/70 |

(Continued)

FOREIGN PATENT DOCUMENTS

JP    2019168417 A   * 10/2019

OTHER PUBLICATIONS

"Fast Range Image-Based Segmentation of Sparse 3D Laser Scans for Online Operation," Bogoslavskyi et al., 2016 IEEE/RSJ International Conference of Intelligent Robots and Systems (IROS), 2016, pp. 163-169. (Year: 2016).*

(Continued)

*Primary Examiner* — Dino Kujundzic
(74) *Attorney, Agent, or Firm* — CANTOR COLBURN LLP

(57) ABSTRACT

A system in a vehicle includes a lidar system to transmit incident light and receive reflections from one or more objects as a point cloud of points. The system also includes processing circuitry to identify planar points and to identify edge points of the point cloud. Each set of planar points forms a linear pattern and each edge point is between two sets of planar points, and the processing circuitry identifies each point of the points of the point cloud as being within a virtual beam among a set of virtual beams. Each virtual beam of the set of virtual beams representing a horizontal band of the point cloud.

18 Claims, 4 Drawing Sheets

(56) References Cited

U.S. PATENT DOCUMENTS

2022/0036650 A1\* 2/2022 Gomez ................. G06V 10/82
2023/0116869 A1\* 4/2023 Zhou .................... G05D 1/0212
701/25

OTHER PUBLICATIONS

"Fast segmentation of 3D point clouds: A paradigm on LiDAR data for autonomous vehicle applications," Zermas et al., 2017 IEEE International Conference on Robotics and Automation (ICRA), Singapore, 2017, pp. 5067-5073. (Year: 2017).\*

Lidar for Autonomous Driving: The Principles, Challenges, and Trends for Automotive Lidar and Perception Systems, Li et al., EEE Signal Processing Magazine, vol. 37, No. 4, Jul. 2020, pp. 50-61. (Year: 2020).\*

"LIDAR-based 3D object perception," Himmelsbach et al., 1st Int. Workshop on Cognition for technical systems, 2008, 7 pgs. (Year: 2008).\*

\* cited by examiner

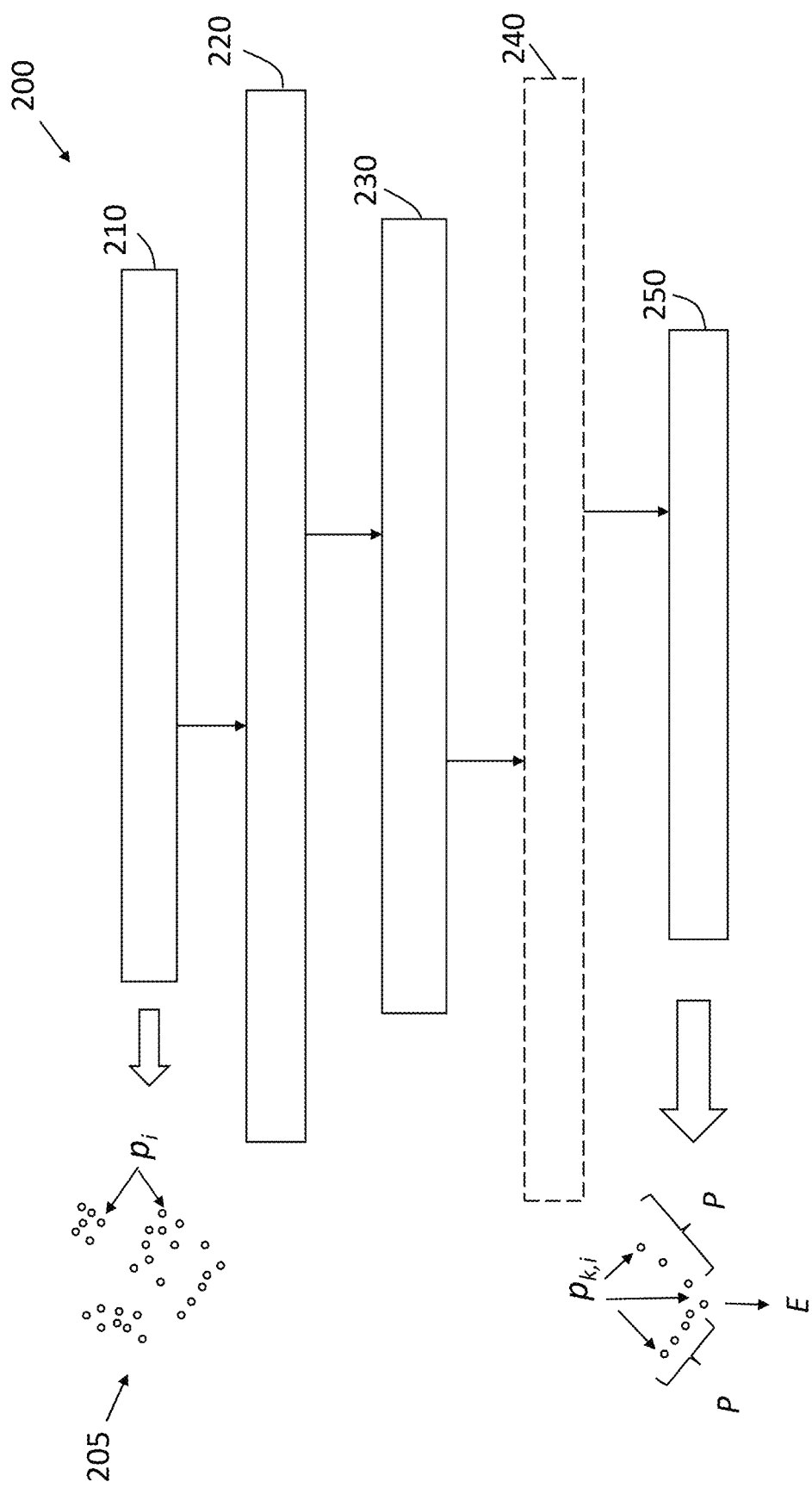

VIRTUAL BEAMS FOR IDENTIFICATION OF EDGE AND PLANAR POINTS IN LIDAR POINT CLOUD OBTAINED WITH VEHICLE LIDAR SYSTEM

INTRODUCTION

The subject disclosure relates to virtual beams for the identification of edge and planar points in a lidar point cloud obtained with a vehicle lidar system.

Vehicles (e.g., automobiles, trucks, construction equipment, farm equipment) increasingly include sensors that obtain information about the vehicle and its environment. The information facilitates semi-autonomous or autonomous operation of the vehicle. For example, sensors (e.g., camera, radar system, lidar system, inertial measurement unit (IMU), steering angle sensor) may facilitate semi-autonomous maneuvers such as automatic braking, collision avoidance, or adaptive cruise control. A lidar system obtains a point cloud that must be processed to obtain information that would facilitate control of vehicle operation. Accordingly, it is desirable to provide virtual beams for the identification of edge and planar points in a lidar point cloud obtained with a vehicle lidar system.

SUMMARY

In one exemplary embodiment, a system in a vehicle includes a lidar system to transmit incident light and receive reflections from one or more objects as a point cloud of points. The system also includes processing circuitry to identify planar points and to identify edge points of the point cloud. Each set of planar points forms a linear pattern and each edge point is between two sets of planar points, and the processing circuitry identifies each point of the points of the point cloud as being within a virtual beam among a set of virtual beams. Each virtual beam of the set of virtual beams representing a horizontal band of the point cloud.

In addition to one or more of the features described herein, the lidar system is a beam-based lidar system that transmits each beam of incident light across a horizontal scan line.

In addition to one or more of the features described herein, the lidar system is a non-beam-based lidar system that transmits each beam of incident light over an area.

In addition to one or more of the features described herein, the lidar system obtains the point cloud by aggregating two or more of the point clouds obtained over two or more frames.

In addition to one or more of the features described herein, for each of the points $p_i$ of the point cloud, the processing circuitry identifies the virtual beam that the point $p_i$ is within by computing a vertical angle of the point $p_i$ given that each virtual beam of the set of virtual beams is defined by a set of the vertical angles.

In addition to one or more of the features described herein, a position of the point $p_i=[x_i, y_i, z_i]$ and the processing circuitry computes the vertical angle $\theta_i$ of the point $p_i$ as:

$$\theta_i = \arctan\frac{z_i}{\sqrt{x_i^2 + y_i^2}}.$$

In addition to one or more of the features described herein, the processing circuitry computes an azimuth angle $\varphi_i$ of each point $p_i$ as:

$$\varphi_i=\arctan 2(x_i,y_i).$$

In addition to one or more of the features described herein, the processing circuitry identifies the planar points and the edge points separately for the points in each virtual beam of the set of virtual beams.

In addition to one or more of the features described herein, the processing circuitry uses laser odometry and mapping (LOAM) to identify the planar points and the edge points within each virtual beam of the set of virtual beams.

In addition to one or more of the features described herein, the processing circuitry identifies one or more objects based on the planar points and the edge points.

In another exemplary embodiment, a method in a vehicle includes obtaining, at processing circuitry from a lidar system configured to transmit incident light and receive reflections from one or more objects, a point cloud of points. The method also includes identifying, by the processing circuitry, planar points and edge points of the point cloud. Each set of planar points forms a linear pattern and each edge point is between two sets of planar points. The identifying the planar points and the edge points includes identifying each point of the points of the point cloud as being within a virtual beam among a set of virtual beams. Each virtual beam of the set of virtual beams representing a horizontal band of the point cloud.

In addition to one or more of the features described herein, the obtaining the point cloud is from a beam-based lidar system that transmits each beam of incident light across a horizontal scan line.

In addition to one or more of the features described herein, the obtaining the point clous is from a non-beam-based lidar system that transmits each beam of incident light over an area.

In addition to one or more of the features described herein, the obtaining the point cloud includes aggregating two or more of the point clouds obtained over two or more frames.

In addition to one or more of the features described herein, for each of the points $p_i$ of the point cloud, the identifying the virtual beam that the point $p_i$ is within is based on computing a vertical angle of the point $p_i$ given that each virtual beam of the set of virtual beams is defined by a set of the vertical angles.

In addition to one or more of the features described herein, a position of the point $p_i=[x_i, y_i, z_i]$ and the computing the vertical angle $\theta_i$ of the point $p_i$ is as:

$$\theta_i = \arctan\frac{z_i}{\sqrt{x_i^2 + y_i^2}}.$$

In addition to one or more of the features described herein, computing an azimuth angle $\varphi_i$ of each point $p_i$ is as:

$$\varphi_i=\arctan 2(x_i,y_i).$$

In addition to one or more of the features described herein, the identifying the planar points and the edge points is done separately for the points in each virtual beam of the set of virtual beams.

In addition to one or more of the features described herein, the identifying the planar points and the edge points is based on using laser odometry and mapping (LOAM) within each virtual beam of the set of virtual beams.

In addition to one or more of the features described herein, the method also includes the processing circuitry identifying one or more objects based on the planar points and the edge points.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 2 is a process flow of a method of using virtual beams for identification of edge and planar points in a lidar point cloud obtained with a lidar system according to one or more embodiments;

DETAILED DESCRIPTION

Figure 1:
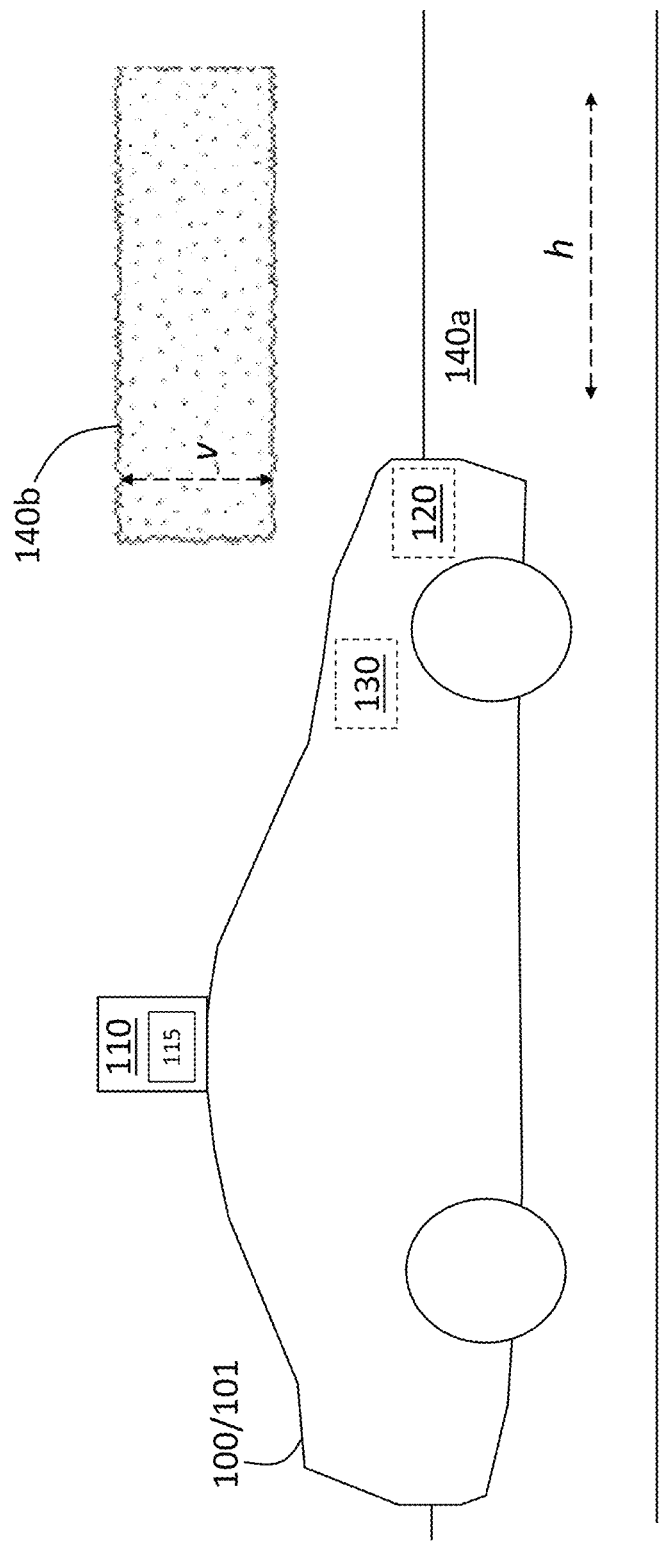
FIG. 1 is a block diagram of a vehicle using virtual beams for the identification of edge and planar points in a lidar point cloud obtained with a lidar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a point cloud obtained with a lidar system must be processed in order to obtain information about detected objects. The process is referred to as feature extraction. More specifically, feature extraction refers to the identification of features such as edges and planes within the point cloud. The identification of these edges and planes facilitates the identification of objects in the scene. A beam-based point cloud refers to one that is made up of multiple horizontal scan lines corresponding to multiple beams of the light source (e.g., laser) that are transmitted to obtain the point cloud as reflections. That is, each scan line corresponds to a transmitted beam. The vertical resolution of a beam-based point cloud is limited by how close the transmitted beams and, consequently, how close the scan lines are to each other. Thus, another type of point cloud that may be obtained is a non-beam-based point cloud. A non-beam-based point cloud may refer, for example, to a point cloud formed as a patch (e.g., cube) per beam. Such a point cloud does not include the horizontal scan lines that define a beam-based point cloud.

Prior feature extraction techniques (e.g., laser odometry and mapping (LOAM)) are well-suited to beam-based point clouds but rely on the horizontal scan lines and, thus, are unsuited for non-beam-based point clouds. Embodiments of the systems and methods detailed herein relate to virtual beams for the identification of edge and planar points in a lidar point cloud obtained with a vehicle lidar system. That is, feature extraction is performed by first forming virtual beams. A point cloud is artificially divided into horizontal strips (i.e., into virtual beams that would have resulted from virtual horizontal scan lines) whether it is a beam-based point cloud or a non-beam-based (e.g., cube-based) point cloud. Known feature extraction techniques may then be applied to the virtual beams to identify edges and planes within the point cloud.

Figure 3A:
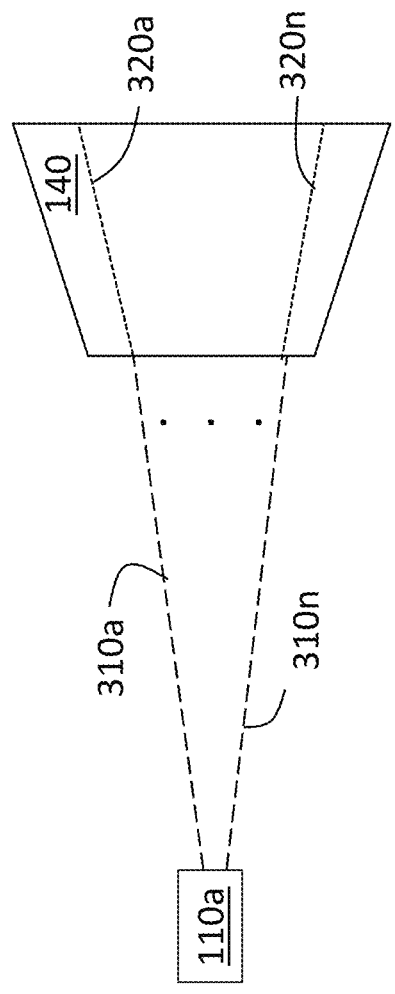
FIG. 3A illustrates an exemplary beam-based lidar system that generates a point cloud within which edges and planar points are identified according to one or more embodiments.
Figure 3B:
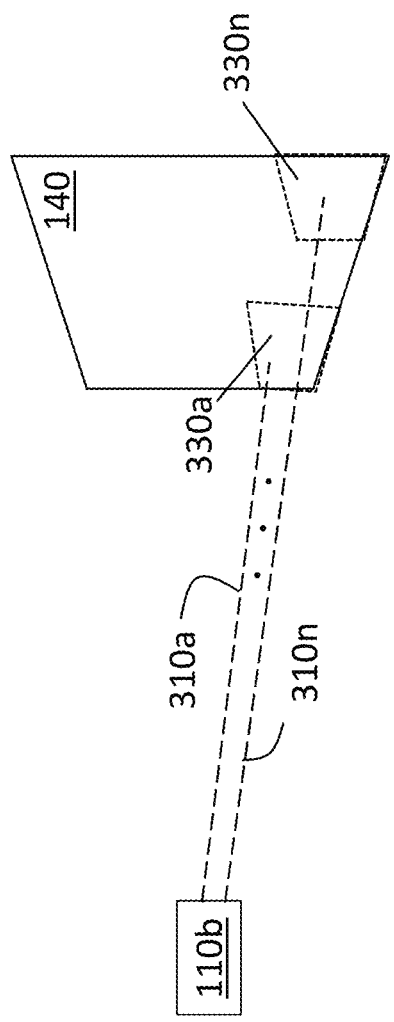
FIG. 3B illustrates an exemplary non-beam-based lidar system that generates a point cloud within which edges and planar points are identified according to one or more embodiments.

In accordance with an exemplary embodiment, FIG. 1 is a block diagram of a vehicle 100 using virtual beams 410 (FIG. 4) for the identification of edge and planar points $p_i$ in a lidar point cloud 205 (FIG. 2) obtained with a lidar system 110. The exemplary vehicle 100 shown in FIG. 1 is an automobile 101. The lidar system 110 may be beam-based or non-beam-based, as illustrated in FIGS. 3A and 3B. The lidar system 110 includes a lidar controller 115. The vehicle 100 includes additional sensors 120 (e.g., radar system, camera, IMU) and a controller 130. The controller 130 may obtain information from the lidar system 110 and other sensors 120 and may control semi-autonomous or autonomous operation of the vehicle 100. The numbers and locations of the lidar system 110 and other sensors 120 are not intended to be limited by the exemplary illustration in FIG. 1.

The feature extraction processes (i.e., processes to identify edge and planar points among the point cloud 205) discussed for the lidar system 110 may be performed by the lidar controller 115, controller 130, or a combination of the two. The lidar controller 115 and controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In FIG. 1, two exemplary objects 140a, 140b (generally referred to as 140) in the field of view of the lidar system 110 are shown. The object 140a is a road surface and the object 140b is a hedge row. The lidar system 110 transmits incident light and receives reflected light. The reflected light is a result of reflection of the incident light by different parts of the objects 140 in the field of view of the lidar system 110. The reflected light is in the form of points $p_i$ that form a point cloud 205 (FIG. 2). In order to identify and locate objects 140 within the point cloud 205, the point cloud 205 must be processed. Specifically, feature extraction may be performed using virtual beams, as discussed with reference to FIG. 2.

The feature extraction results in the identification of points $p_i$ that are part of a set of edge points E or a set of planar points P. The points $p_i$ in the set of planar points P may be part of a horizontal plane h or a vertical plane v. An exemplary horizontal plane h from which points $p_i$ in the point cloud 205 may be obtained is illustrated by the road surface (object 140a). Similarly, an exemplary vertical plane v from which points $p_i$ in the point cloud 205 may be obtained is illustrated by the hedge row 140b. When the point cloud 205 is obtained, performing feature extraction based on using virtual beams 410 may help to identify the object 140.

FIG. 2 is a process flow of a method 200 of using virtual beams 410 for identification of edge and planar points $p_i$ in a lidar point cloud 205 obtained with a lidar system 110 according to one or more embodiments. At block 210, the processes include aggregating n consecutive frames of lidar data (i.e., point clouds 205). That is, points $p_i$ obtained over a number of frames (i.e., timestamps) may be taken together as the points of the point cloud 205, as shown in FIG. 2.

According to exemplary embodiments, the value of n may be 1 (i.e., one frame is considered individually). At block 220, the processes include calculating a vertical angle $\theta_i$ and an azimuth angle $\varphi_i$ for each point", =[$x_i$, $y_i$, $z_i$]. The vertical angle $\theta_i$ is obtained as:

$$\theta_i = \arctan\frac{z_i}{\sqrt{x_i^2 + y_i^2}} \quad [\text{EQ. 1}]$$

The azimuth angle $\varphi_i$ is obtained as:

$$\varphi_i = \arctan 2(x_i, y_i) \quad [\text{EQ. 2}]$$

At block 230, determining the index k of the virtual beam 410 in which each point $p_i$ is positioned is based on the vertical angle $\theta_i$ of the point $p_i$. Specifically, for a given vertical angle $\theta_i$:

$$\theta_k^b \leq \theta_i < \theta_{k+1}^b \quad [\text{EQ. 3}]$$

The vertical angles of adjacent virtual beams 410 are $\theta_k^b$ and $\theta_{k+1}^b$. In that case, the point $p_i$ is associated with the virtual beam 410 with index k. Once each of the points $p_i$ is associated with a particular virtual beam 410, at block 230, any known feature extraction method that would typically be used only for beam-based lidar systems may be employed, at block 250, to identify a set of edge points E and a set of planar points P in the point cloud 205. When LOAM is employed at block 250, the processes at block 240 are additionally needed and, thus, are indicated as optional.

At block 240, for each virtual beam 410, associated points $p_i$ are sorted by their corresponding azimuth angles $\varphi_i$. That is, the points $p_i$ within a given virtual beam 410 are arranged in order of increasing or decreasing value of azimuth angle $\varphi_i$. At block 250, LOAM may be used according to an exemplary embodiment and, in that case, the processes at block 240 are performed first. Based on implementing LOAM, within each virtual beam 410 with an index k, identifying points $p_{k,i}$ that are part of the set of edge points E and points $p_{k,i}$ that are part of the set of planar points P is based on a computed smoothness $c_{k,i}$, which is given by:

$$c_{k,i} = \frac{1}{|S|\|p_{k,i}\|}\left\|\sum_{j \in S, j \neq i}(p_{k,i} - p_{k,j})\right\| \quad [\text{EQ. 4}]$$

In EQ. 4, S is the set of indices of the points $p_{k,j}$ in the virtual beam 240 of index k that are close to point $p_{k,i}$. Close points $p_{k,j}$ are those with azimuth angles co, within a predefined threshold of the azimuth angle of the point $p_{k,i}$. Points $p_{k,i}$ that result in a high value of smoothness $c_{k,i}$ (i.e., a $c_{k,i}$ greater than a threshold value) are added to the set of edge points E, and the points $p_{k,i}$ that result in a low value of smoothness $c_{k,i}$ (i.e., a $c_{k,i}$ below the threshold value) are added to the set of planar points P. Exemplary points $p_{k,i}$ that are part of sets of planar points P and a set of edge points E are shown. As shown, planar points $p_{k,i}$, in each of the sets of planar points P, form a linear pattern, while an edge point $p_{k,j}$, in the set of edge points E, is between and borders two different sets of planar points P (i.e., two linear patterns that are in different directions).

FIG. 3A illustrates an exemplary beam-based lidar system 110a and FIG. 3B illustrates an exemplary non-beam-based lidar system 110b. Each of the lidar systems 110a, 110b is shown with an object 140 (e.g., wall) in its field of view. As shown in FIG. 3A, each beam 310a through 310n (generally referred to as 310) results in a horizontal scan line 320a through 320n (generally referred to as 320). Thus, the point cloud 205 formed from reflections of the scan lines 320 would also be in the form of lines with separation in the vertical dimension, corresponding with the vertical angle $\theta_i$, that corresponds with a separation between adjacent beams 310. As previously noted, this limits the vertical resolution of the beam-based lidar system 110a according to how closely the beams 310 are spaced. According to one or more embodiments, virtual beams 410 (FIG. 4) may be generated. Based on the width of each virtual beam 410, the vertical resolution may be improved.

As shown in FIG. 3B, each beam 310 results in an area 330a through 330n (generally referred to as 330) or a patch that is scanned by the beam. Thus, in the non-beam-based lidar system 110b, a horizontal scan is not accomplished by each beam 310 individually, as it is in the beam-based lidar system 110a. According to one or more embodiments, virtual beams 410 (FIG. 4) are generated to facilitate feature extraction based on smoothness $c_{k,i}$.

Figure 4:
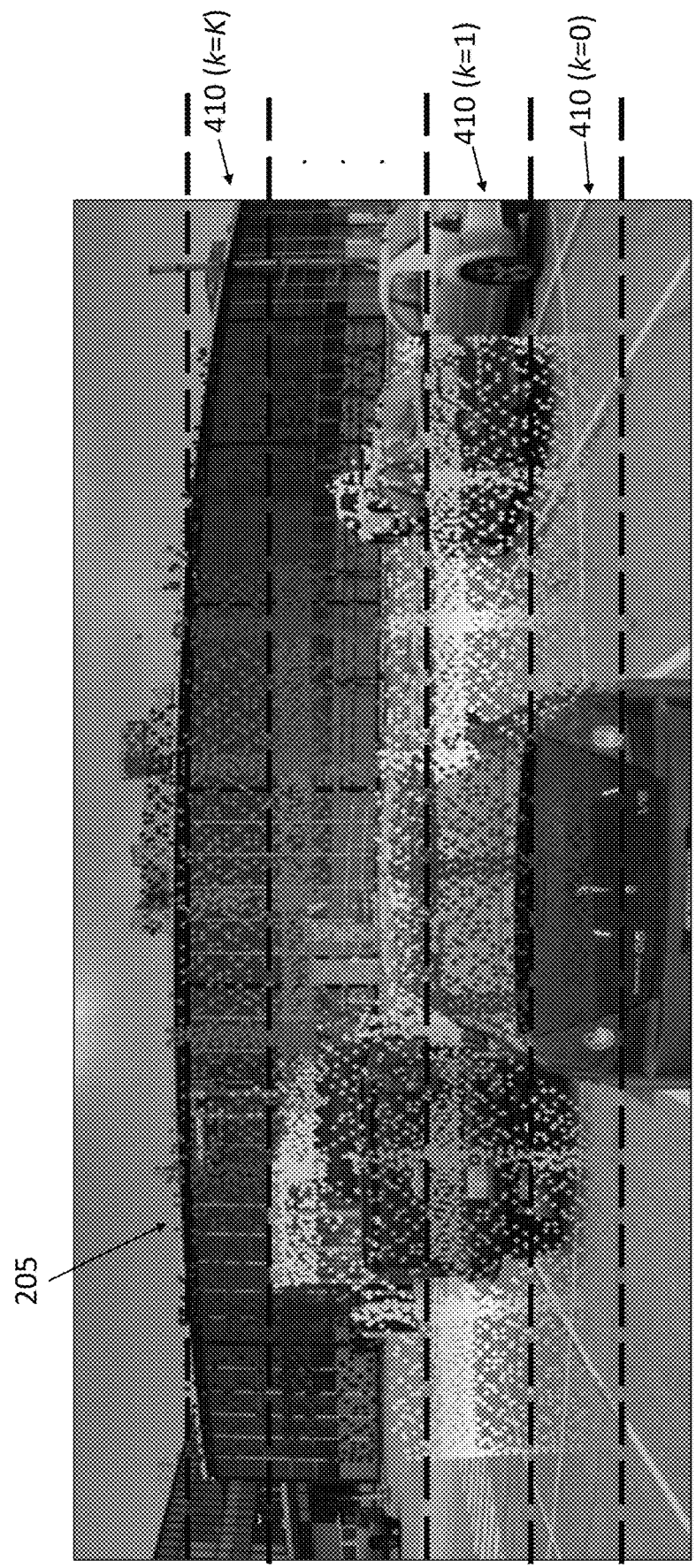
FIG. 4 illustrates virtual beams used for the identification of edge and planar points in a lidar point cloud obtained with a lidar system according to one or more embodiments.

FIG. 4 illustrates virtual beams 410 used for the identification of edge and planar points $p_i$ in a lidar point cloud 205 obtained with a lidar system 110 according to one or more embodiments. An exemplary point cloud 205 obtained by a non-beam-based lidar system 110 is shown. Virtual beams 410, each of which represents a horizontal band of the point cloud 205, with index k=0 through k=K are indicated. As discussed with reference to FIG. 2, smoothness $c_{k,i}$ is computed for each of the points $p_{k,i}$ that fall in each virtual beam 410, at block 250. That smoothness $c_{k,i}$ is checked to determine if each of the points $p_{k,i}$ is an edge point that belongs in the set E or a planar point that belongs in the set P.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system in a vehicle comprising:
a lidar system configured to transmit incident light and receive reflections from one or more objects as a point cloud of points $p_i$; and
processing circuitry configured to:
assign each point $p_i$ of the point cloud into a one of k horizontal strips each corresponding to a virtual beam of light emitted from the lidar system based on a vertical angle of each point $p_i$, wherein each of the k horizontal strips corresponds to a unique range of vertical angles and wherein each $p_i$=[$x_i$, $y_i$, $z_i$] and the vertical angle $\theta_i$ of the point $p_i$ is calculated as:

$$\theta_i = \arctan\frac{z_i}{\sqrt{x_i^2 + y_i^2}}.$$

identify a set of planar points and edge points in each of the k horizontal strips, wherein each set of planar points in the k horizontal strips forms a linear pattern and each edge point is disposed between two sets of planar points; and identify one or more objects in a field of view of the lidar system based on the planar points and the edge points.

2. The system according to claim 1, wherein the lidar system is a beam-based lidar system that transmits each beam of incident light across a horizontal scan line.

3. The system according to claim 2, wherein at least one of the k horizontal strips includes points that correspond to different horizontal scan lines.

4. The system according to claim 1, wherein the lidar system is a non-beam-based lidar system that transmits each beam of incident light over an area.

5. The system according to claim 1, wherein the lidar system obtains the point cloud by aggregating two or more of the point clouds obtained over two or more frames.

6. The system according to claim 1, wherein the processing circuitry is configured to compute an azimuth angle $\varphi_i$ of each point $p_i$ as:

$$\varphi_i = \arctan 2(x_i, y_i).$$

7. The system according to claim 1, wherein the processing circuitry is configured to identify the planar points and the edge points separately for the points in each virtual beam.

8. The system according to claim 7, wherein the processing circuitry uses laser odometry and mapping (LOAM) to identify the planar points and the edge points within each virtual beam.

9. The system according to claim 1, wherein a width of each of the k horizontal strips is determined based on a desired vertical resolution of the lidar system.

10. A method in a vehicle, the method comprising:
transmitting, by a lidar system, incident light and receive reflections from one or more objects;
creating, by the lidar system, a point cloud of points $p_i$ based on the received reflections;
assigning each point $p_i$ of the point cloud into a one of k horizontal strips each corresponding to a virtual beam of light emitted from the lidar system based on a vertical angle of each point $p_i$, wherein each of the k horizontal strips corresponds to a unique range of vertical angles and wherein each $p_i = [x_i, y_i, z_i]$ and the vertical angle $\theta_i$ of the point $p_i$ is calculated as:

$$\theta_i = \arctan \frac{z_i}{\sqrt{x_i^2 + y_i^2}}.$$

identifying, by a processing circuitry, a set of planar points and edge points in each of the k horizontal strips, wherein each set of planar points forms a linear pattern and each edge point is disposed between two sets of planar points; and
identifying, by the processing circuitry, one or more objects based on the planar points and the edge points.

11. The method according to claim 10, wherein the obtaining the point cloud is from a beam-based lidar system that transmits each beam of incident light across a horizontal scan line.

12. The method according to claim 11, wherein at least one of the k horizontal strips includes points that correspond to different horizontal scan lines.

13. The method according to claim 10, wherein the obtaining the point cloud is from a non-beam-based lidar system that transmits each beam of incident light over an area.

14. The method according to claim 10, wherein the obtaining the point cloud includes aggregating two or more of the point clouds obtained over two or more frames.

15. The method according to claim 10, wherein computing an azimuth angle $\varphi_i$ of each point $p_i$ is as:

$$\varphi_i = \arctan 2(x_i, y_i).$$

16. The method according to claim 10, wherein the identifying the planar points and the edge points is done separately for the points in each virtual beam of the set of virtual beams.

17. The method according to claim 16, wherein the identifying the planar points and the edge points is based on using laser odometry and mapping (LOAM) within each virtual beam of the set of virtual beams.

18. The method according to claim 10, wherein a width of each of the k horizontal strips is determined based on a desired vertical resolution of the lidar system.

* * * * *